United States Patent
Hwang et al.

(10) Patent No.: US 7,130,937 B2
(45) Date of Patent: Oct. 31, 2006

(54) METHOD FOR PROVIDING A VIDEO DATA STREAMING SERVICE

(75) Inventors: In Seong Hwang, Seoul (KR); Sang Ho Chae, Seoul (KR); Hee Won Park, Seoul (KR); Keun Hee Shin, Seoul (KR); Chang Ho Choi, Gyeonggi-do (KR); Won Hee Sull, Gyeonggi-do (KR)

(73) Assignee: SK Telecom Co., Ltd., Seoul (KR)

( * ) Notice: Subject to any disclaimer, the term of this patent is extended or adjusted under 35 U.S.C. 154(b) by 216 days.

(21) Appl. No.: 10/496,257

(22) PCT Filed: Nov. 22, 2002

(86) PCT No.: PCT/KR02/02187

§ 371 (c)(1),
(2), (4) Date: Sep. 23, 2004

(87) PCT Pub. No.: WO03/045047

PCT Pub. Date: May 30, 2003

(65) Prior Publication Data
US 2005/0033879 A1    Feb. 10, 2005

(30) Foreign Application Priority Data
Nov. 22, 2001    (KR) .................... 10-2001-0072939

(51) Int. Cl.
*R06F 3/00* (2006.01)

(52) U.S. Cl. ............................ 710/57; 710/52; 709/231
(58) Field of Classification Search ................. 710/57, 710/52; 386/52; 709/231
See application file for complete search history.

(56) References Cited

U.S. PATENT DOCUMENTS

| 5,450,410 A | 9/1995 | Hluchyj et al. ............. 370/94.1 |
| 6,944,221 B1* | 9/2005 | Keesman ............... 375/240.02 |
| 2002/0036704 A1* | 3/2002 | Kim et al. ............... 348/390.1 |
| 2003/0206558 A1* | 11/2003 | Parkkinen et al. .......... 370/477 |

FOREIGN PATENT DOCUMENTS

| KR | 1020020021577 | 3/2002 |
| WO | WO 01/22682 A2 | 3/2001 |

* cited by examiner

*Primary Examiner*—Fritz Fleming
*Assistant Examiner*—Harold Kim
(74) *Attorney, Agent, or Firm*—Sheridan Ross P.C.

(57) ABSTRACT

In a method for providing a video data streaming service, a server determines whether an occupancy is below a first threshold or is equal to or greater than a second threshold, the occupancy representing the amount of data occupying a queuing buffer of a terminal and the first threshold being less than the second threshold. If the occupancy is not below the first threshold, the server provides the data streaming service at a predetermined service bit rate which is less than the current service bit rate. If the occupancy is equal to or greater than a second threshold, the server provides the data streaming service at a predetermined service bit rate which is greater than the current service bit rate.

5 Claims, 2 Drawing Sheets

| ID<br>[1 BYTE] | Qu_TOTAL<br>[1 BYTE] | Qu_PRESENT<br>[1 BYTE] | SeqNo<br>[2 BYTES] |
|---|---|---|---|

METHOD FOR PROVIDING A VIDEO DATA STREAMING SERVICE

FIELD OF THE INVENTION

The present invention relates to a method for providing a video data streaming service; and, more particularly, to a method for dynamically controlling the amount of video data provided from a server to a terminal based on a data transfer rate in a network.

BACKGROUND OF THE INVENTION

Conventionally, a server transmits data to a terminal at a predetermined transmission rate in performing a video data streaming service through a network.

Accordingly, when there occurs a network congestion due to an instantaneous increase in the number of users concurrently accessing the network, e.g., a wireless network, through which a video data streaming service is provided, or when a mobile terminal of a user is in a shadow zone, where the quality of the wireless network is deteriorated, video data being reproduced in the user's terminal malt be broken-off or be delayed,

SUMMARY OF THE INVENTION

It is, therefore, an object of the present invention to provide a method for performing a video data streaming service by dynamically controlling the amount of video data provided from a server to a terminal on the basis of a data transfer rate in a network, thereby preventing a sudden break-off or delay of the data being reproduced in the terminal.

In accordance with the present invention, there is provided a method for providing a video data streaming service between a server and a terminal in a wireless network, the method including the steps of: (a) starting the data streaming service at a service bit rate requested by the terminal; (b) receiving an occupancy of a queuing buffer of the terminal, wherein the occupancy represents the amount of data of the data streaming service occupying the queuing buffer of the terminal; (c) determining whether the occupancy is below a first threshold or is equal to or greater than a second threshold, wherein the first threshold is less than the second threshold; (d) if the occupancy is below the first threshold, determining whether a current service bit rate is a lowest service bit rate among the predetermined service bit rates and, if a determination result is negative, providing the data streaming service at a predetermined service bit rate which is less than the current service bit rate; and (e) if the occupancy is equal to or greater than a second threshold, providing the data streaming service at a predetermined service bit rate which is greater than the current service bit rate.

BRIEF DESCRIPTION OF THE DRAWINGS

The above and other objects and features of the present invention will become apparent from the following description of a preferred embodiment given in conjunction with the accompanying drawings, in which.

DETAILED DESCRIPTION OF THE INVENTION

Figures 1, 2:
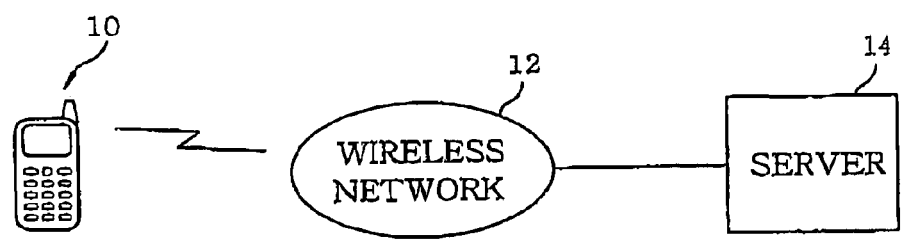
FIG. 1 shows a network system for performing a video data streaming service in accordance with the present invention.
FIG. 2 is a schematic drawing describing a structure of packet data transmitted from a terminal to a server shown in FIG. 1.

Referring to FIG. 1, there is illustrated a network system for performing a video data streaming service in accordance with the present invention. A server 14 provides a video data streaming service to a terminal 10 through a wireless network 12.

The terminal 10 is connected to the server 14 through the wireless network 12 and a user of the terminal requests the server 14 for the video data streaming service. In response to the user's request, the server 14 provides the video data streaming service to the user's terminal 10 through the wireless network 12.

In FIG. 2, there is shown a structure of packet data transmitted to the server 14 from the terminal 10 to report a filling state of a queuing buffer, wherein the packet data is utilized in a Change Bit Rate (CBR) command and has a preset format including ID, Qu_Total, Qu_Present, and SeqNo.

The ID serves as an identifier of the CBR command, which includes a field having a size of 1 byte and represents a use of the data packet.

The Qu_Total having a field of 1 byte indicates total size of a queuing buffer (not shown) within the terminal 10.

The Qu_Present having a field of 1 byte represents a size of data currently remaining in the buffer, wherein the data can be expressed in 'second's. In the preferred embodiment of the present invention, the Qu_Present is expressed in a unit of, e.g., 100 ms.

The SeqNo having a field of 2 bytes is utilized in keeping track of the packet data which is continuously received by the server, by incrementing the SeqNo by 1 (initially at 0) every time the terminal 10 sends the CBR command to the server 14.

Figure 3:
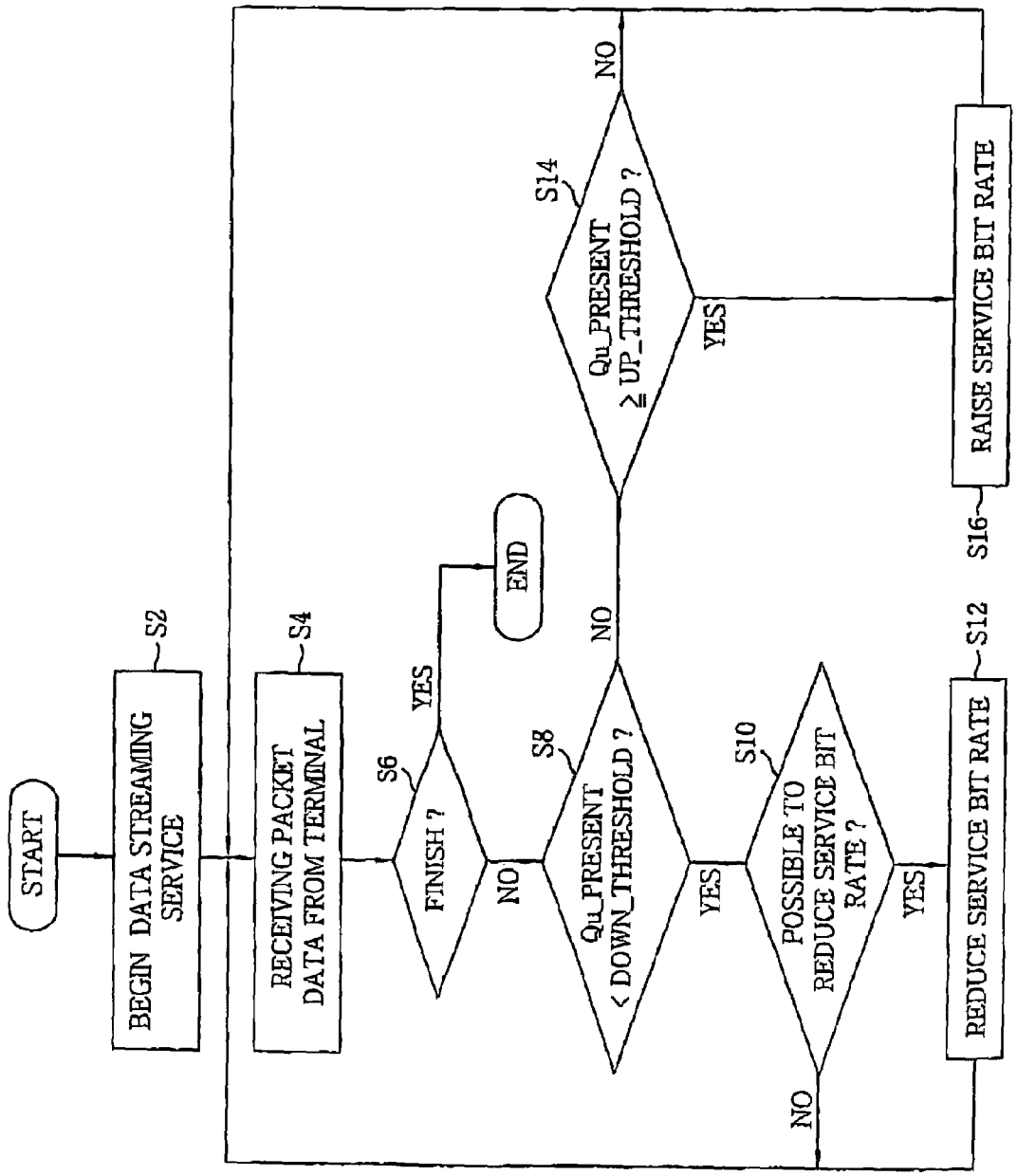
FIG. 3 sets forth a flow chart for performing a video data streaming service in accordance with the preferred embodiment of the present invention.

Referring to FIG. 3, there is described a method for providing a video data streaming service in accordance with the preferred embodiment of the present invention.

First, the terminal 10 connected to the server 14 through the wireless network 12 requests a start of the video data streaming service. In response to the request from the terminal 10, the server 14 first defines a size of the queuing buffer of the terminal 10, e.g., about 10 seconds, by recording a buffersizeDB having such size in an initial object descriptor (IOD) and then initiates the video data streaming service, i.e., contents service.

Next, the server 14 starts the contents service at a bit rate (service bit rate) of, e.g., about 128 Kbps requested by the terminal 10 (step S2). At this time, the server 14 transmits data to the terminal 10 at a constant data transfer rate, which is identical to the service bit rate, i.e., 128 Kbps if such is supported by the channel, by utilizing a composition time stamp (CTS) used in synchronizing audio and video data.

Then, the terminal 10 reads the IOD to find the value of the buffersizeDB and an average bit rate of a video data streaming (i.e., service bit rate) and performs a buffering for, e.g., about 10 seconds. Subsequently, the terminal 10 examines its queuing buffer, e.g., every 0.5 second, and encodes an occupancy, i.e., the amount of data occupying the queuing buffer, in the field of Qu_Present of the packet data shown in FIG. 2 having a unit of, e.g., 100 ms. The encoded packet data is then transmitted to the server 14 through the wireless network 12 (step S4).

Despite emphasis on the video data streaming service in this embodiment, a data streaming service may be provided for audio data as well as video data, in which case the filling state of the queuing buffer for each of the audio and video data is encoded conforming to the format of the packet data, as described in FIG. 2, to be transmitted to the server 14.

The procedure terminates if the server 14 does not receive any more packet data from the terminal 10 for a predetermined period, e.g., 2 seconds or if the contents providing service is terminated (step S6).

By receiving and analyzing the packet data sent by the terminal 10, the server 14 determines whether the amount of the data occupying the queuing buffer is below the predetermined threshold value. More specifically, if a value of the Qu_Present of the packet data is less than a predetermined Down_Threshold, the server 14 determines that the data transfer rate is less than the service bit rate due to deterioration in the quality of the wireless network 12 wherein the predetermined Down_Threshold is less than the size of the queuing buffer, e.g., about 3 seconds (step 58). For example, if the data transfer rate in the wireless network 12 decreases, an available data transfer rate in the wireless network 12 is less than a service bit rate that the server 14 provides to the terminal 10.

Thus, a rate at which the terminal 10 reproduces data already received in the queuing buffer is higher than a rate at which the terminal 10 currently receives new data through the wireless network 12. As a result, the size of the queuing buffer, i.e., the amount of data occupying queuing buffer, gradually diminishes and the data which could not be transferred to the terminal 10 becomes accumulated at a buffer in a base station. Such phenomenon continues until the service bit rate to the terminal 10 is adjusted.

If the Qu_Present is below the Down_Threshold, the server 14 checks if the service bit rate can be reduced, i.e., if there exists a contents service with a lower bit rate, e.g., 50 Kbps, than the current contents service rate, e.g., 128 Kbps (step S10). If negative, i.e., the current contents service has the lowest available bit rate, the procedure returns to step S4. If affirmative, the server 14 reduces the service bit rate at which it provides the data streaming service (step S12), making contents data be transmitted to the terminal 10 through the wireless network 12, e.g., at an available transfer rate, and the process proceeds to step S4.

Accordingly, the data, once accumulated in the base station of the wireless network 12, are gradually shifted to the queuing buffer in the terminal 10 as time elapses, so that buffering data for, e.g., about 10 seconds, can be fully received at the terminal 10. The value of the 2-byte SeqNo field of the CBR command that is set initially at 0 is incremented by '1' every time the terminal 10 sends the CBR command to the server 14.

If it is determined that a value of the Qu_Present is not less than a Down_Threshold at step S8, the server 14 determines whether the Qu_Present is equal to or greater than a preset Up_Threshold, thereby determining if the data transfer rate in the wireless network 12 is increased enough to raise the service bit rate of the contents service, wherein the preset Up_Threshold is greater than the size of the queuing buffer (step S14). More specifically, if the Qu_Present of the packet data is equal to or greater than the preset Up_Threshold, the server 14 determines that the service bit rate can be increased to be greater than the service bit rate adjusted at step S12. If the determination result is negative, the process goes back to step S4.

If it is determined at step S14 that Qu_Present is not less than Up_Threshold, the server 14 raises the service bit rate and continues to provide the data streaming service at the raised service bit rate (step S16) and the procedure returns to step S4 It should be apparent to those skilled in the art that the condition Qu_Present $\geqq$ Up_Threshold occurs only when the service bit rate currently being provided is less than the rate initially requested by the terminal, since the maximum data transfer rate of a contents service is set to be identical to the service bit rate initially requested by the terminal 10. It is also to be noted that the maximum service bit rate determined at step S16 is to be equal to the initially requested service bit rate.

As described above, by estimating an available data transfer rate in the wireless network 12 between the server 14 and the terminal 10 while executing the data streaming service, the server 14 can raise/reduce a bit rate of the data, thereby making a high-quality reproduction of the data possible in the terminal 10 and preventing a sudden break-off or delay of the data being reproduced therein.

While the present invention has been shown and described with respect to the preferred embodiment, it will be understood by those skilled in the art that various changes and modifications may be made without departing from the spirit and scope of the present invention as defined in the following claims.

What is claimed is:

1. A method for providing a data streaming service from a server to a terminal through a wireless network, the data streaming service having two or more predetermined service bit rates, the method comprising the steps of:
   (a) starting the data streaming service at a service bit rate requested by the terminal;
   (b) receiving an occupancy of a queuing buffer of the terminal, wherein the occupancy represents the amount of data of the data streaming service occupying the queuing buffer of the terminal;
   (c) determining whether the occupancy is below a first threshold or is equal to or greater than a second threshold, wherein the first threshold is less than the second threshold;
   (d) if the occupancy is below the first threshold, determining whether a current service bit rate is a lowest service bit rate among the predetermined service bit rates and, if a determination result is negative, providing the data streaming service at a predetermined service bit rate which is less than the current service bit rate; and
   (e) if the occupancy is equal to or greater than a second threshold, providing the data streaming service at a predetermined service bit rate which is greater than the current service bit rate.

2. The method of claim 1, further comprising the step of (f) repeating the steps (b) to (e).

3. The method of claim 2, wherein the step (f) continues until the data streaming service is terminated.

4. The method of claim 3, wherein the amount of the data occupying the queuing buffer is checked and reported to the server at a predetermined time interval.

5. The method of claim 4, wherein a maximum service bit rate of the data streaming service being provided from the server to the terminal is not greater than the service bit rate requested by the terminal.

* * * * *